R. Hurd,
Nose Ring,
Nº 34,368, Patented Feb. 11, 1862.
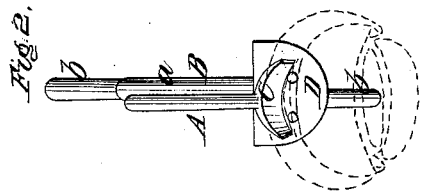
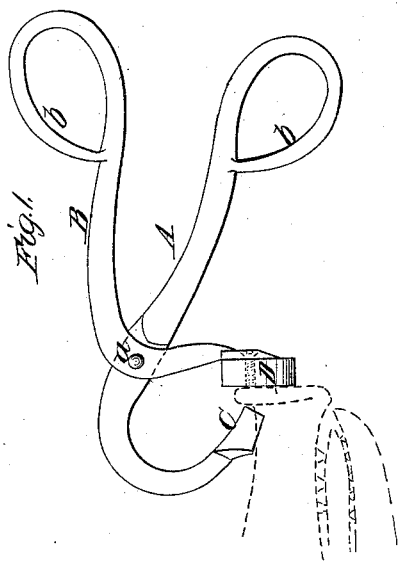
Witnesses:
Inventor:
Reuben Hurd
per Munn & Co
Attorneys

UNITED STATES PATENT OFFICE.

REUBEN HURD, OF SPRING HILL, ILLINOIS.

IMPROVED DEVICE FOR CUTTING THE NOSES OF SWINE TO PREVENT THEM FROM ROOTING.

Specification forming part of Letters Patent No. 34,368, dated February 11, 1862.

*To all whom it may concern:*

Be it known that I, REUBEN HURD, of Spring Hill, in the county of Whiteside and State of Illinois, have invented a new and Improved Implement or Device for Cutting the Noses of Swine to Prevent Them from Rooting; and I do hereby declare that the following is a full, clear, and exact description of the same, reference being had to the accompanying drawings, making a part of this specification, in which—

Figure 1 is a side view of my invention. Fig. 2 is an end view of the same.

Similar letters of reference indicate corresponding parts in the several figures.

The object of this invention is to obtain a simple and efficient implement for cutting the noses or snouts of swine so as to prevent them from rooting, and thereby supersede the ordinary practice of "ringing" for effecting the same result.

The invention consists in the employment or use of a cutter and block attached to the ends of levers which cross each other and are connected by a fulcrum-pin similar to the levers of a pair of scissors, all being arranged as hereinafter fully shown and described to effect the desired purpose.

To enable those skilled in the art to fully understand and construct my invention, I will proceed to describe it.

A B represent two levers which cross each other and are connected by a fulcrum-pin $a$ similar to the levers of a pair of scissors, each lever being provided at one end with an eye $b$ to receive respectively the finger and thumb of the operator. (See Fig. 1.)

The lever A has its front or outer part curved in semicircular form, and a curved cutter C is formed thereon, the cutting-edge $c$ of said cutter facing backward or toward the eye $b$ of its lever A. The lever B also has its outer part curved, but it has a quick bend or curve, so as to extend down about at right angles to its other part and just back of the cutter C. This front part of the lever B has a block D attached to it, which may be of hard wood or other material that will receive the edge $c$ of the knife without injuring it. The block D has its face at right angles with the cutter C when the latter is brought in contact with it, a result which is attained by forcing together the back ends of the levers A B. The levers A B may be of iron, but the cutter C should be of steel properly tempered.

The implement is used as follows: The animal to be operated upon is grasped by the operator or an attendant and the operator distends the back parts of the levers A B by means of the finger and thumb, and thereby throws out the knife C from the block D. The block D is then placed against the end of the upper part of the snout of the animal, (shown in red,) and the knife is then forced against the block D, the former passing through the rim of the snout and severing it, so that the animal loses all power over it for "rooting" purposes. The operation may be very quickly performed, and does not require to be repeated, as the cartilage will not unite after being cut.

Having thus described my invention, what I claim as new, and desire to secure by Letters Patent, is—

An implement or device formed of the levers A B, provided respectively with the cutter C and block D, arranged to operate as and for the purpose herein set forth.

REUBEN HURD.

Witnesses:
LYMAN D. CHASE,
R. A. MAJORS.